ions

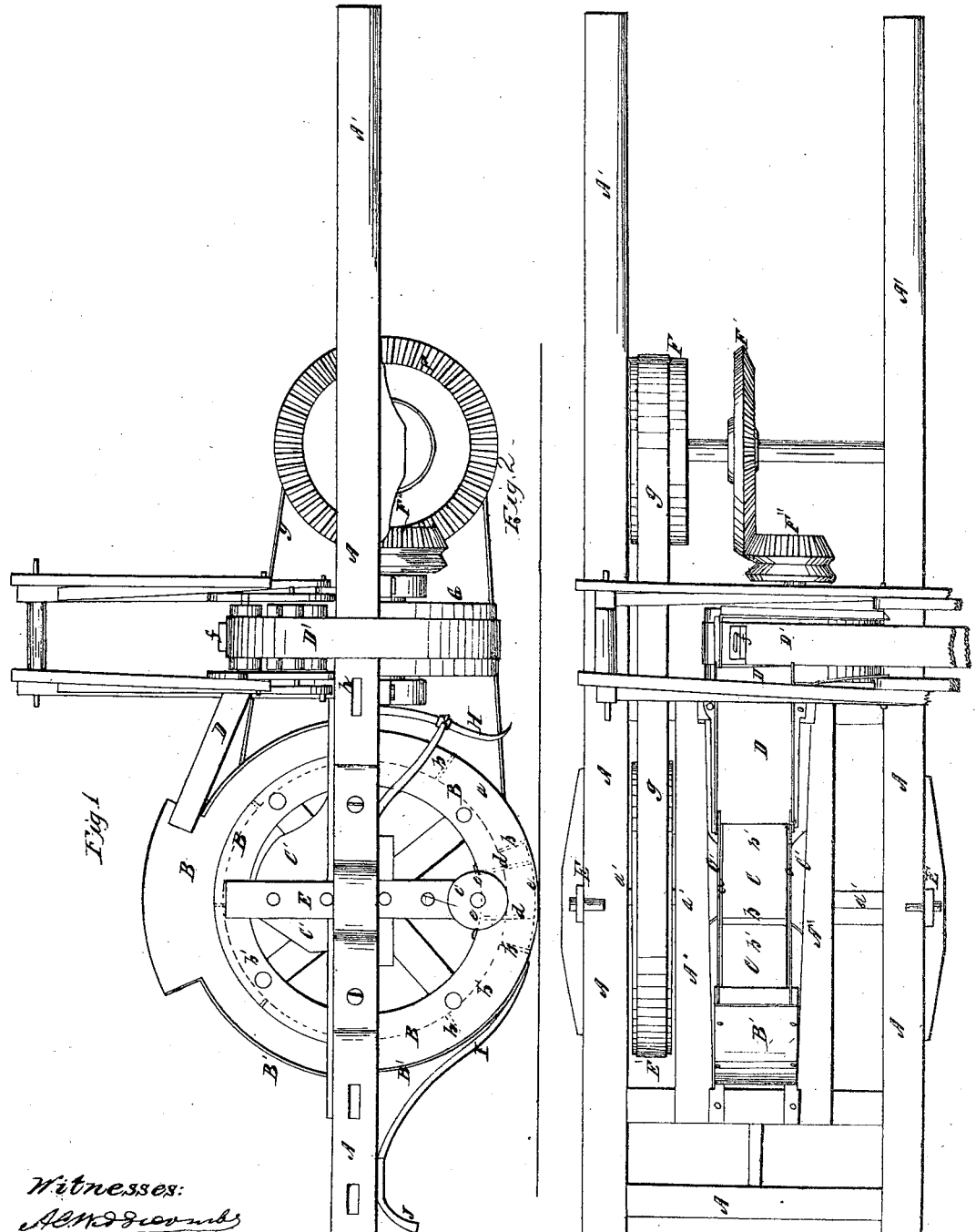

UNITED STATES PATENT OFFICE.

P. W. ADAIRE, OF HAYS CREEK, MISSISSIPPI.

DITCHING-MACHINE.

Specification of Letters Patent No. 28,544, dated June 5, 1860.

*To all whom it may concern:*

Be it known that I, P. W. ADAIRE, of Hays Creek, in the county of Carroll, in the State of Mississippi, have invented a certain new and useful Improvement in Machines for Excavating or Making Ditches; and I do hereby declare that the following is a full, clear, and exact description of the same, reference being had to the accompanying drawings, forming a part of this specification, in which—

Figure 1 represents a side view of my machine looking in the direction of arrow 1, Fig. 2, Fig. 2, represents a plan or top view of my machine with a portion of the earth delivering apparatus broken off just outside of the main frame.

In the drawings, A, A, represents the main frame—the side pieces of which extend forward and form the thills A' A', between which the animal is hitched to draw the machine forward.

B, represents the excavating wheel situated near the center of the machine and having an axle $a'$ which turns in suitable bearing in boxes on the underside pieces A A, of the main frame. The outer periphery of the wheel B, is provided with a series of chambers or boxes C, formed by the metal surface $b'$, of the wheel B, side circular cutting plates $a, a$, and cross pieces $b, b$. Each section or box C, is provided with a sliding bottom $c$, which is connected by guides $d, d$, to a slide piece $e, e$, which works on the inner periphery of the wheel B. A cutter or opener H, is attached to the cross piece $h$, just in front of each of the side cutting plates $a, a$, one of which is shown in Fig. 1. The cutters or openers H, are made adjustable, so that they can be set up or down. The rear of the wheel B, and consequently the boxes C, are incased by a shield or stationary guard B'. A plow piece I, extends from the rear of the machine down under the rear of the wheel B, as shown in the drawings.

The operation is as follows: As the machine is drawn forward, the cutters, H, open places in the earth into which the circular plates $a, a$, run, while the weight of the machine causes the wheel B, to settle into the earth so that side wheels $e'$ attached to adjustable standards E, as shown in the drawings, (see Fig. 1, where one of the wheels is fully shown) rest on the surface of the ground and thereby steady the machine and keep it from canting over.

The settling of the wheel B, into the earth, causes the earth to enter and fill the boxes C, while the plow I, separates the earth and causes that portion of it which fills the boxes or spaces C, to pass up with the wheel in front of the shield B, until it reaches the top of the wheel, when the guide piece $e'$ is elevated by stationary cams C', C', attached to the pieces A'', A'', whereby the false bottoms $c$, are forced out even with the side cutters $a, a$, thus shoving the earth into the spout D down which it descends by its own gravity until it lands on the endless conveyer D' by which it is carried up and off at the side of the machine.

Motion is communicated to conveyer D', from wheel E', on shaft $a$, of the wheel B, by belt $q$, which passes on wheel F, thus giving motion to gear wheel F'', which in turn gives motion to gear wheel F''', to whose shaft the wheel G, is fastened which gives motion to the endless conveyer D'.

Cross pieces $f$, may be used to keep the earth from sliding back on the conveyer D', when it is to be raised up much of an inclination. The conveyer D', may be supported on any suitable frame work, and by making it so that it can be reversed, the earth can all be thrown off on one side of the ditch whichever way the machine may be moving. This arrangement would be quite convenient in making ditches on side hills.

The wheels $e'$, answer another purpose from that of keeping the machine from canting over while in use, viz: wheels by which the machine can be transported from place to place. To arrange the machine for this purpose, the rear is raised up so as to lift the wheel B entirely off of the ground and the standards E, E, dropped down so as to let their wheels $e'$, (only one of which is shown in the drawings) rest on the ground, where they are held by pins passed through holes in standards E, under the side pieces A, A, of the main frame. Rear handles J, may be used if found necessary to enable an attendant or attendants to steady the machine by hand.

The machine may be of any proper size and proportion.

Having described my machine, I do not wish to be understood as claiming the various parts of my machine separately considered, but

What I claim as new and desire to secure by Letters Patent is:

The combination of the frame A, and adjustable standard E, E, with wheel B, circular cutting plates $a$, $a$, cross pieces $b$, $b$, false bottoms $c$, guide pieces $e'$, cams C', C', guide or shield B', plow I, and openers H, arranged and operating in relation to each other as and for the purposes set forth.

P. W. ADAIRE.

Attest:
WILLIS BARFIELD,
S. $\underset{\text{mark}}{\overset{\text{his}}{\times}}$ W. HILL.